United States Patent [19]
Zajac, Jr.

[11] Patent Number: 5,755,475
[45] Date of Patent: May 26, 1998

[54] DEVICE FOR GRIPPING A WORKPIECE

[75] Inventor: Theodore S. Zajac, Jr., Elyria, Ohio

[73] Assignee: Zaytran, Inc., Elyria, Ohio

[21] Appl. No.: 626,152

[22] Filed: Apr. 4, 1996

[51] Int. Cl.⁶ ...................................................... B25J 15/08
[52] U.S. Cl. ........................ 294/88; 294/86.4; 294/119.1; 901/37
[58] Field of Search ................................. 294/1.1, 86.4, 294/88, 119.1; 901/31, 37, 49, 50; 414/8, 741; 269/25, 32, 33

[56] References Cited

U.S. PATENT DOCUMENTS

| | | |
|---|---|---|
| 3,289,485 | 12/1966 | Cazalis et al. |
| 4,591,199 | 5/1986 | Zajac . |
| 4,735,452 | 4/1988 | Nemoto .................... 294/119.1 |
| 4,802,815 | 2/1989 | Funabashi et al. ............ 414/8 |
| 4,836,048 | 6/1989 | Torii et al. .................. 414/8 |
| 4,913,481 | 4/1990 | Chin et al. . |
| 4,972,731 | 11/1990 | Akutagawa et al. ............ 901/50 |
| 5,000,652 | 3/1991 | Christensen et al. . |
| 5,054,834 | 10/1991 | Alessandri et al. . |
| 5,529,359 | 6/1996 | Borcea et al. ................. 294/88 |

FOREIGN PATENT DOCUMENTS

| | | | |
|---|---|---|---|
| 45-512 | 2/1982 | European Pat. Off. .......... 294/86.4 |
| 1657-371 | 6/1991 | U.S.S.R. ........................ 901/50 |
| 2041262 | 9/1980 | United Kingdom ............. 294/119.1 |

*Primary Examiner*—Dean Kramer
*Attorney, Agent, or Firm*—Renner, Otto, Boisselle & Sklar, P.L.L.

[57] ABSTRACT

A device for moving members into engagement with a workpiece includes a housing having surfaces for defining a chamber and first and second pistons located in the chamber movable toward and away from each other. A first connector connects the first piston to a member movable into engagement with the workpiece and extends through a first opening in the housing. A second connector connects the second piston to another member movable into engagement with the workpiece and extends through a second opening in the housing. Fluid pressure is applied to opposite sides of the first and second pistons to move the first and second pistons toward and away from each other. Debris is removed from the first and second openings in the housing through which the first and second connectors extend.

12 Claims, 3 Drawing Sheets

DEVICE FOR GRIPPING A WORKPIECE

BACKGROUND OF THE INVENTION

The present invention relates to a device for gripping a workpiece. In particular, the present invention relates to a device for moving workpiece gripping jaws toward and away from each other.

A device for moving members into engagement with a workpiece to grip the workpiece is used in robotics and many other types of material handling equipment. In some instances the device is used in a clean room environment and debris must be prevented from exiting the device into the clean room environment. In some instances the device is used in a very dirty environment, such as where machining hard materials like carbide or silicon is occurring. In a very dirty environment debris must be prevented from entering the device and causing undue wear to the parts of the device.

U.S. Pat. No. 4,913,481 discloses a known device for moving members into engagement with a workpiece for use in a clean room environment. The device disclosed in U.S. Pat. No. 4,913,481 includes sliding jaws and a means for moving the jaws toward and away from each other. The jaws include upper and lower finger sections. Each of the lower finger sections is provided with a seal located between the lower finger section and an outer surface of an evacuated chamber within the unit. Therefore, no particles or dust created in the unit may escape into the clean room environment.

SUMMARY OF THE INVENTION

The present invention is a device for moving members into engagement with a workpiece to grip the workpiece. The device includes a housing having surface means for defining a chamber and first and second pistons located in the chamber movable toward and away from each other. A first means for connecting the first piston to a member movable into engagement with the workpiece extends through a first opening in the housing. A second means for connecting the second piston to another member movable into engagement with the workpiece extends through a second opening in the housing. The device further includes means for applying fluid pressure to opposite sides of the first and second pistons to move the first and second pistons toward and away from each other and means for removing debris from the first and second openings in the housing through which the first and second connecting means extend.

If the device is used in a clean room environment, the first and second openings through which the first and second connecting means extend are connected to vacuum to prevent any debris from exiting the device and entering the clean room environment. If the device is used in a very dirty environment, the first and second openings through which the first and second connecting means extend are connected to an air compressor to blow any debris out of the openings and prevent debris from entering the device and causing rapid wear of the parts.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
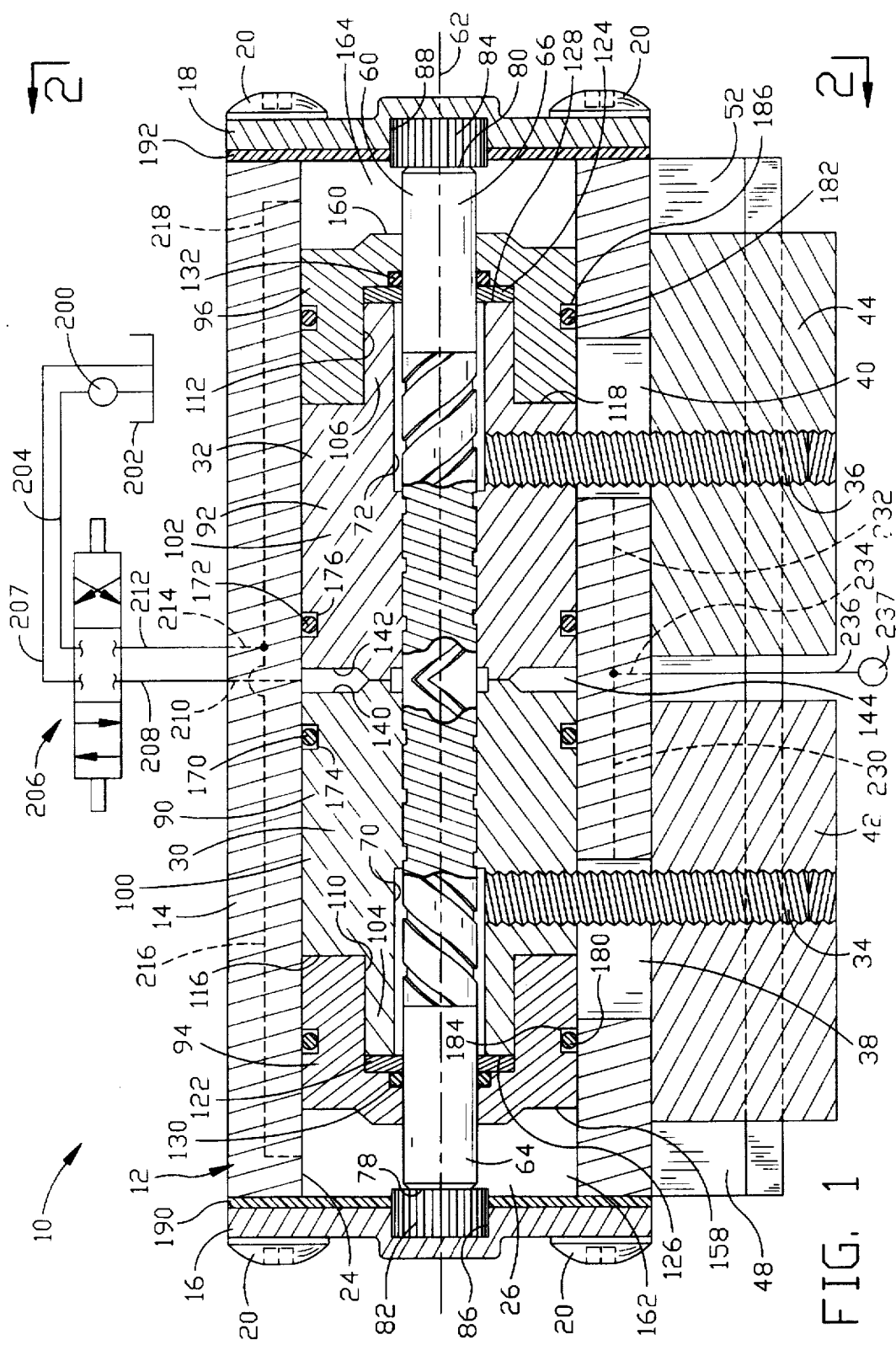
FIG. 1 is a sectional view of a first embodiment of a device embodying the present invention.

A first embodiment of a device 10 (FIG. 1) for moving members into engagement with a workpiece includes a housing 12 having a central portion 14, and a pair of end plates 16 and 18. The end plates 16 and 18 are connected to the central portion 14 by suitable fasteners such as bolts 20. The central portion 14 includes a radially inner surface 24 defining a cylindrical chamber 26 closed by the end plates 16 and 18.

A pair of pistons 30, 32 are located within the cylindrical chamber 26 and slidably engage the radially inner surface 24 of the housing 12. Screws 34, 36 threadably engage the pistons 30, 32 and extend through openings 38, 40 in the central portion 14. The screws 34, 36 threadably engage members or grippers 42, 44 for engaging a workpiece to connect the pistons 30, 32 with the grippers. Alternatively, the workpiece engaging members or jaws (not shown) could be fastened on the members 42, 44, as is well known in the art.

Figure 2:
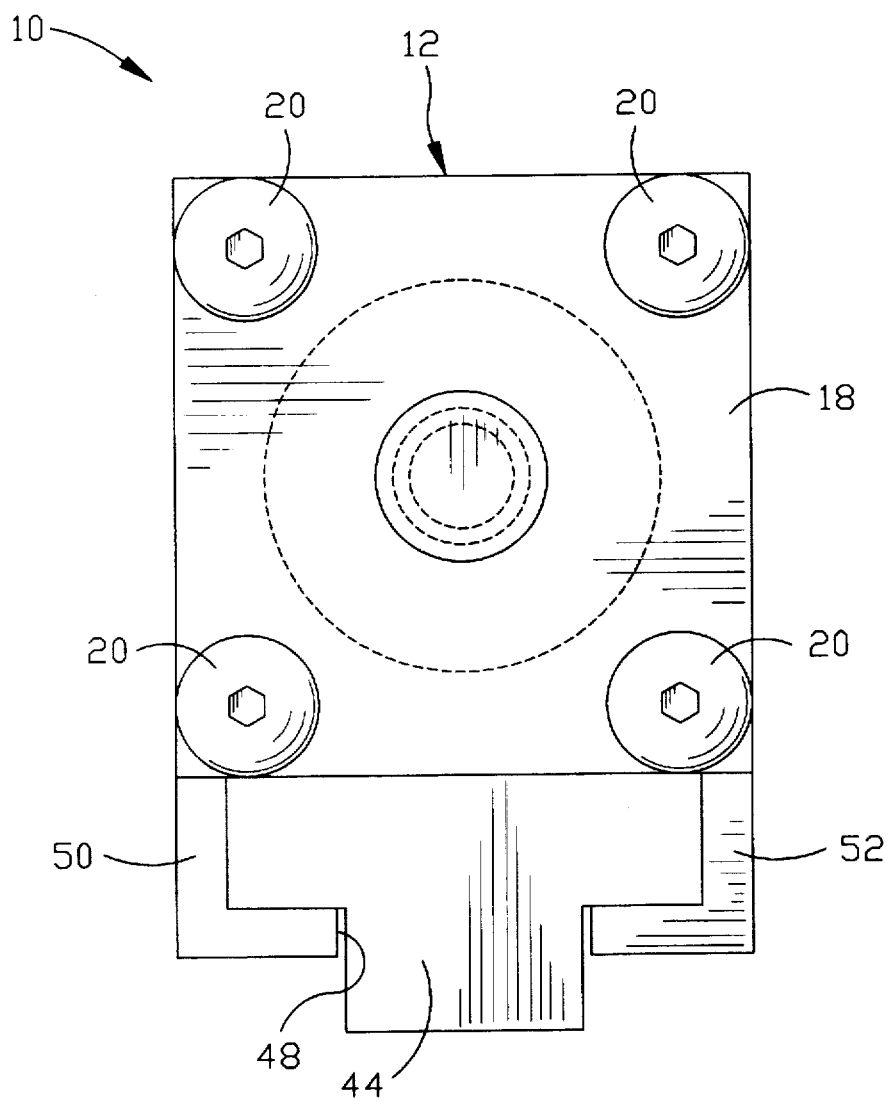
FIG. 2 is a side view of the device of FIG. 1 looking at the device as indicated by the line 2—2 in FIG. 1.

The grippers 42, 44 preferably have a T-shaped cross section, as shown in FIG. 2, and move in a slideway 48. The slideway 48 is defined by flanges 50 and 52 extending from the central portion 14 of the housing 12. When the pistons 30, 32 move away from each other, the grippers 42, 44 move away from each other. When the pistons 30, 32 move toward each other, the grippers 42, 44 move toward each other. Accordingly, movement of the pistons 30, 32 toward and away from each other provide for respective movement of the grippers 42, 44 so that the grippers grip and release a workpiece.

A longitudinally extending rod 60 arranged along an axis 62 of the housing 12 ensures synchronous movement of the pistons 30, 32 and, thereby, synchronous movement of the grippers 42, 44. The rod ends 64, 66 are provided with respective right and left hand helical splines that engage oppositely inclined right and left hand splines in axially extending openings 70, 72 of the pistons 30, 32. Engagement between the pistons 30, 32 and the respective rod ends 64, 66 provides a driving interconnection between the pistons and the rod 60 that effects rotation of the rod upon axial movement of the pistons.

Axial end surfaces 78, 80 of the rod 60 engage disks 82, 84 located in recesses 86, 88 in the end plates 16, 18 of the housing 12. The disks 82, 84 are preferably made of a suitable plastic material and axially position the rod 60 in the housing 12. The disks 82, 84 have splines which engage splines of the recesses 86, 88 in the end plates 16, 18 to prevent rotation of the disks relative to the end plates.

The pistons 30, 32 include axially inner portions 90, 92 that threadably receive the screws 34, 36 and drivingly engage the rod 60. Axially outer portions 94, 96 of the pistons 30, 32 are fixedly connected to the axially inner portions 90, 92 by an adhesive, or any other suitable means. The axially inner and outer portions of the pistons 30, 32 are preferably made of polyethylene terephthalate (PET) or bronze.

The axially inner portions 90, 92 of the pistons 30, 32 include first portions 100, 102 with outer diameters in sliding engagement with the surface 24 defining the cylindrical chamber 26 and second portions 104, 106 with outer diameters smaller than the outer diameters of the first portions. The second portions 104, 106 are received in openings 110, 112 in the axially outer portions 94, 96. The first portions 100, 102 and the second portions 104, 106 define shoulders 116, 118 against which the axially outer portions 94, 96 engage. Washers 122, 124, preferably made of stainless steel, engage axial end surfaces 126, 128 of the second portions 104, 106 and retain seal rings 130, 132 in recesses in the axially outer portions 94, 96. The seal rings 130, 132 engage the rod 60 to prevent fluid from flowing along the rod.

Axial end surfaces 140, 142 of the pistons 30, 32 face each other. The axial end surfaces 140, 142 and the surface 24 of the housing 12 defining the cylindrical chamber 26 define a first fluid pressure chamber 144. The fluid pressure chamber 144 receives fluid pressure to move the pistons 30, 32 away from each other.

The pistons 30, 32 include axial end surfaces 158, 160 opposite from the axial end surfaces 140, 142. The axial end surface 158 of the piston 30, surface 24 of the housing 12, and the end plate 16 define a fluid pressure chamber 162. The axial end surface 160 of the piston 32, the surface 24 of the housing 12, and the end plate 18 define a pressure chamber 164. Fluid pressure is directed to the pressure chambers 162 and 164 to move the pistons 30, 32 toward each other.

Seal rings 170, 172 located in grooves 174, 176 in the pistons 30, 32 help prevent leaking of fluid from the fluid pressure chamber 144 along the outer diameters of the pistons. Seal rings 180, 182 located in grooves 184, 186 of the pistons 30, 32 help prevent leaking of fluid from the pressure chambers 162, 164 along the outer diameters of the pistons. A rubber gasket 190 clamped between the end plate 16 and one end of the central portion 14 of the housing 12 prevents leaking of fluid from the pressure chamber 162. A rubber gasket 192 clamped between the end plate 18 and the other end of the central portion 14 prevents leaking of fluid from the pressure chamber 164.

The seal rings 170 and 180 are located on axially opposite sides of the screw 34. The seal rings 170 and 180 are located on axially opposite sides of the opening 38 in the housing 12 in all positions of the piston 30. The seal rings 172 and 182 are located on axially opposite sides of the screw 36. The seal rings 172 and 182 are located on axially opposite sides of the opening 40 in all positions of the piston 32.

An air compressor 200 supplies air to the pressure chambers 144, 162, and 164. The compressor 200 conducts fluid from a source of fluid 202 through a conduit 204 to a control valve 206. A conduit 207 conducts fluid from the control valve 206 to the source of fluid 202. The control valve 206 directs fluid to and from the pressure chambers 144, 162, and 164 to move the pistons 30, 32.

A conduit 208 conducts fluid between the control valve 206 and a passage 210, schematically shown in FIG. 1, in the housing 12. The passage 210 in the housing conducts fluid between the conduit 208 and the pressure chamber 144. A conduit 212 conducts fluid between the control valve 206 and a passage 214, schematically shown in FIG. 1, in the housing. The passage 214 conducts fluid to and from passages 216, 218, schematically shown in FIG. 1, in the housing 12. The passages 216, 218 are connected to the pressure chambers 162, 164, respectively.

A passage 230 in the housing 12, schematically shown in FIG. 1, extends between the opening 38 and an intersection of passages 230, 232 and 234, schematically shown in FIG. 1. The passage 232 in the housing extends between the opening 40 in the housing and the intersection of passages 230, 232 and 234. The passages 230 and 232 are in fluid communication. The passage 234 is connected to a conduit 236 that is connected with a source of vacuum 237.

When the device 10 is to be used in a clean air environment, debris, including debris in the compressed air supplied by the compressor 200, must be prevented from exiting the housing 12 into the clean air environment. Any debris in the compressed air which passes any of the seals 170, 172, 180, 182 must exit through the openings 38 and 40 to contaminate the clean air environment. The debris getting into the openings 38 and 40 is evacuated and conducted through the passages 230, 232, and 234 and the conduit 236. Thus, the debris is prevented from contaminating the clean air environment.

The position of the parts shown in FIG. 1 corresponds to the position of the parts when a workpiece is being engaged. To release the workpiece, the control valve 206 is actuated, and fluid pressure is supplied into the fluid pressure chamber 144 through the conduit 208 and passage 210. The pistons 30, 32 move away from each other and may move until surfaces 158, 160 engage the end plates 16, 18. Accordingly, a workpiece held by the grippers 42, 44 is released. Fluid from the chambers 162, 164 is directed through the passages 214, 216 and conduit 212 and conducted back to the source of fluid 202.

When a workpiece is to be engaged, fluid is directed into the passages 214, 216 and chambers 162, 164. The pistons 30, 32 move the grippers 42, 44 toward each other so that the grippers engage the workpiece. The pistons 30, 32 may move until the end surfaces 140, 142 engage each other or a workpiece is engaged by the grippers 42, 44. Fluid is directed from the chamber 144 and conducted back to the source of fluid 202.

As the pistons 30, 32 move toward and away from each other, the rod 60 rotates about the axis 62. When the pistons 30, 32 move away from each other, the rod 60 rotates in one direction. As the pistons 30, 32 move toward each other, the rod 60 rotates in an opposite direction. The engagement of the splines on the pistons 30, 32 and the rod 60 ensures that the pistons move in the housing at the same rate to ensure synchronous movement of the pistons. Although the pistons 30, 32 and the rod 60 are shown as having engaging splines, the pistons and the rod may have engaging threads for ensuring synchronous movement of the pistons.

In the embodiment of the invention illustrated in FIGS. 1 and 2, the openings 38 and 40 are connected with vacuum to prevent debris from exiting the housing 12. In the embodiment of the invention illustrated in FIG. 3, the openings have compressed air blown into them to prevent debris from entering the housing. Since the embodiment of the invention illustrated in FIG. 3 is generally similar to the embodiment of the invention illustrated in FIGS. 1 and 2, similar numerals will be utilized to designate similar components, the suffix "a" being associated with the numerals of FIG. 3 to avoid confusion.

Figure 3:
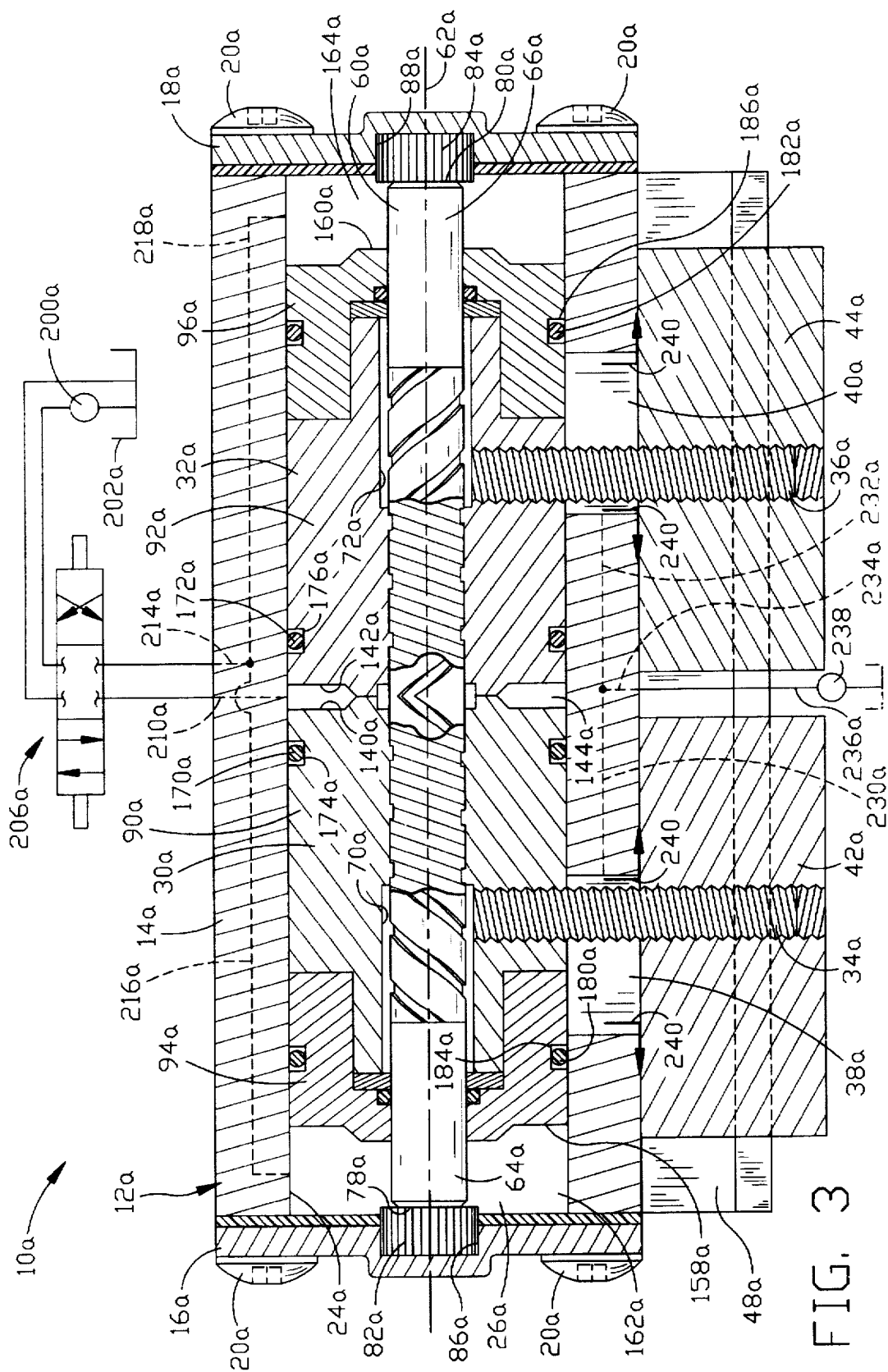
FIG. 3 is a sectional view of a second embodiment of a device embodying the present invention.

The device 10a of FIG. 3 includes a housing 12a having a central portion 14a, and a pair of end plates 16a and 18a. The end plates 16a and 18a are connected to the central portion 14a by suitable fasteners such as bolts 20a. The central portion 14a includes a radially inner surface 24a defining a cylindrical chamber 26a closed by the end plates 16a and 18a.

A pair of pistons 30a, 32a are located within the cylindrical chamber 26a and slidably engage the radially inner surface 24a of the housing 12a. Screws 34a, 36a threadably engage the pistons 30a, 32a and extend through openings 38a, 40a in the central portion 14a. The screws 34a, 36a threadably engage grippers 42a, 44a that move in a slideway 48a.

A longitudinally extending rod 60a arranged along an axis 62a of the housing 12a ensures synchronous movement of the pistons 30a, 32a and, thereby, synchronous movement of the grippers 42a, 44a. The rod ends 64a, 66a are provided with respective right and left hand helical splines that engage oppositely inclined right and left hand splines in axially extending openings 70a, 72a of the pistons 30a, 32a. Engagement between the pistons 30a, 32a and the respective rod ends 64a, 66a provides a driving interconnection between the pistons and the rod 60a that effects rotation of the rod upon axial movement of the pistons.

Axial end surfaces 78a, 80a of the rod 60a engage disks 82a, 84a located in recesses 86a, 88a in the end plates 16a, 18a of the housing 12a. The disks 82a, 84a are preferably made of a suitable plastic material and axially position the rod 60a in the housing 12a. The disks 82a, 84a have splines which engage splines of the recesses 86a, 88a in the end plates 16a, 18a to prevent rotation of the disks relative to the end plates.

The pistons 30a, 32a include axially inner portions 90a, 92a that threadably receive the screws 34a, 36a and drivingly engage the rod 60a. Axially outer portions 94a, 96a of the pistons 30a, 32a are fixedly connected to the axially inner portions 90a, 92a by an adhesive, or any other suitable means. The axially inner and outer portions of the pistons 30a, 32a are preferably made of polyethylene terephthalate (PET) or bronze.

Axial end surfaces 140a, 142a of the pistons 30a, 32a face each other. The axial end surfaces 140a, 142a and the surface 24a of the housing 12a defining the cylindrical chamber 26a define a first fluid pressure chamber 144a. The fluid pressure chamber 144a receives fluid pressure to move the pistons 30a, 32a away from each other.

The pistons 30a, 32a include axial end surfaces 158a, 160a opposite from the axial end surfaces 140a, 142a. The axial end surface 158a of the piston 30a, surface 24a of the housing 12a, and the end plate 16a define a fluid pressure chamber 162a. The axial end surface 160a of the piston 32a, the surface 24a of the housing 12a, and the end plate 18a define a pressure chamber 164a. Fluid pressure is directed to the pressure chambers 162a and 164a to move the pistons 30a, 32a toward each other.

Seal rings 170a and 180a are located in grooves 174a and 184a in the piston 30a. The seal rings 170a and 180a are located on axially opposite sides of the set screw 34a and are always located on axially opposite sides of the opening 38a. Seal rings 172a and 182a are located in grooves 176a and 186a of the piston 32a. The seal rings 172a and 182a are located on axially opposite sides of the set screw 36a and are always located on axially opposite sides of the opening 40a.

An air compressor 200a supplies air to the pressure chambers 144a, 162a, and 164a. The compressor 200a conducts fluid from a source of fluid 202a to a control valve 206a. The control valve 206a directs fluid to and from the pressure chambers 144a, 162a, and 164a to move the pistons 30a, 32a. A passage 210a, schematically shown in FIG. 3, in the housing 12a conducts fluid between the control valve 206a and the pressure chamber 144a. Passages 214a, 216a, and 218a conduct fluid between the control valve 206a and the pressure chambers 162a, 164a.

A passage 230a in the housing 12a, schematically shown in FIG. 3, extends between the opening 38a and an intersection of passages 230a, 232a and 234a, schematically shown in FIG. 3. The passage 232a in the housing 12a extends between the opening 40a in the housing and the intersection of passages 230a, 232a, and 234a. The passages 230a and 232a are in fluid communication. The passage 234a is connected to a conduit 236a that is connected with an air compressor 238 for blowing compressed air into the openings 38a and 40a.

When the device 10a is to be used in a dirty environment, debris in the environment must be prevented from entering the housing 12a and causing the parts of the device to rapidly wear. Any debris that gets into the openings 38a and 40a is blown out between the slides 42a, 44a and the housing 12a, as shown by arrows 240 in FIG. 3.

The position shown in FIG. 3 corresponds to the position of the parts when a workpiece is being engaged. To release the workpiece, the control valve 206a is actuated, and fluid pressure is supplied into the fluid pressure chamber 144a. The pistons 30a, 32a move away from each other and may move until surfaces 158a, 160a engage the end plates 16a, 18a. Accordingly, a workpiece held by the grippers 42a, 44a is released. When a workpiece is to be engaged, fluid is directed into the chambers 162a, 164a. The pistons 30a, 32a move the grippers 42a, 44a toward each other so that the grippers engage the workpiece. The pistons 30a, 32a may move until the end surfaces 140a, 142a engage each other or a workpiece is engaged by the grippers 42a, 44a. As the pistons 30a, 32a move toward and away from each other, the rod 60a rotates about the axis 62a. The engagement of the splines on the pistons 30a, 32a and the rod 60a ensures that the pistons move in the housing at the same rate to ensure synchronous movement of the pistons.

It should be understood from the above that the same mechanism (unit) may be used in a clean room environment attached to a source of vacuum and may be used in a dirty environment attached to a source of compressed air.

From the above description of the invention, those skilled in the art will perceive improvements, changes and modifications. Such improvements, changes and modifications within the skill of the art are intended to be covered by the appended claims.

Having describe the invention, the following is claimed:

1. An apparatus for moving members into engagement with a workpiece comprising:

a housing including surface means for defining a chamber;

first and second pistons located in said chamber and movable toward and away from each other;

first means for connecting said first piston to a member movable into engagement with the workpiece, said first connecting means extending through a first opening in said housing;

second means for connecting said second piston to another member movable into engagement with the workpiece, said second connecting means extending through a second opening in said housing;

means for applying fluid pressure to opposite sides of said first and second pistons to move said first and second pistons toward and away from each other; and means for removing debris from said first and second openings in said housing through which said first and second connecting means extend;

wherein said debris removing means comprises means for blowing debris away from said openings to prevent debris from entering said housing through said first and second openings.

2. An apparatus for moving members into engagement with a workpiece comprising:

a housing including surface means for defining a chamber;

first and second pistons located in said chamber and movable toward and away from each other;

first means for connecting said first piston to a member movable into engagement with the workpiece, said first connecting means extending through a first opening in said housing;

second means for connecting said second piston to another member movable into engagement with the workpiece, said second connecting means extending through a second opening in said housing;

means for applying fluid pressure to opposite sides of said first and second pistons to move said first and second pistons toward and away from each other; and means for removing debris from said first and second openings in said housing through which said first and second connecting means extend;

wherein said debris removing means comprises passages located in said housing connected between said first and second openings in said housing;

said apparatus further including an air compressor connected with said passages, said passages conducting compressed air to said first and second openings to blow debris out of said first and second openings.

3. An apparatus for moving members into engagement with a workpiece comprising:

a housing including surface means for defining a chamber;

first and second pistons located in said chamber and movable toward and away from each other;

first means for connecting said first piston to a member movable into engagement with the workpiece, said first connecting means extending through a first opening in said housing;

second means for connecting said second piston to another member movable into engagement with the workpiece, said second connecting means extending through a second opening in said housing;

means for applying fluid pressure to opposite sides of said first and second pistons to move said first and second pistons toward and away from each other;

means for preventing debris from entering said housing through said first and second openings in said housing through which said first and second connecting means extend; and wherein said means for preventing debris from entering said housing comprises means for blowing debris away from said openings to prevent debris from entering said housing.

4. An apparatus for moving members into engagement with a workpiece comprising:

a housing including surface means for defining a chamber;

first and second pistons located in said chamber and movable toward and away from each other;

first means for connecting said first piston to a member movable into engagement with the workpiece, said first connecting means extending through a first opening in said housing;

second means for connecting said second piston to another member movable into engagement with the workpiece, said second connecting means extending through a second opening in said housing;

means for applying fluid pressure to opposite sides of said first and second pistons to move said first and second pistons toward and away from each other;

means for preventing debris from entering said housing through said first and second openings in said housing through which said first and second connecting means extend; and wherein said means for preventing debris from entering said housing comprises passages located in said housing connected between said first and second openings in said housing.

5. An apparatus as set forth in claim 4 further including a compressor connected with said passages, said passages conducting compressed air to said first and second openings to blow debris out of said first and second openings.

6. An apparatus for moving members into engagement with a workpiece comprising:

a housing including surface means for defining a chamber;

first and second pistons located in said chamber and movable toward and away from each other;

first connecting means for connecting said first piston to a member movable into engagement with the workpiece, said first connecting means extending through a first opening in said housing;

second connecting means for connecting said second piston to another member movable into engagement with the workpiece, said second connecting means extending through a second opening in said housing;

means for applying fluid pressure to opposite sides of said first and second pistons to move said first and second pistons toward and away from each other;

a passage in said housing connected between said first and second openings in said housing and a conduit having one end connected to said passage and the other end selectively connectable either to a source of air at higher than ambient pressure or to air at a lower than ambient pressure.

7. An apparatus as set forth in claim 6 wherein said housing includes first and second ends closing opposite ends of said chamber, said first and second openings through which said first and second connecting means extend being located between said first and second ends.

8. An apparatus as set forth in claim 6 wherein said first connecting means includes a first fastener connected to said first piston and extending through said first opening in said housing, said second connecting means including a second fastener connected to said second piston and extending through said second opening in said housing.

9. An apparatus as set forth in claim 8 wherein said first piston includes seals located on axially opposite sides of said first fastener and slidably engaging said surface means defining said chamber in said housing, said second piston including seals located on axially opposite sides of said second fastener and slidably engaging said surface means defining said chamber.

10. An apparatus as set forth in claim 9 wherein said seals on said first piston are always located on axially opposite sides of said first opening and said seals on said second piston are always located on axially opposite sides of said second opening.

11. An apparatus as set forth in claim 6 wherein each of said first and second pistons includes a first axial end surface, said surface means of said housing defining said chamber and said first axial end surfaces of said first and second pistons defining a first fluid pressure chamber between said first axial end surfaces of said first and second pistons, said fluid pressure applying means including means for directing fluid pressure to said first fluid pressure chamber to apply pressure against said first axial end surfaces of said first and second pistons and move said first and second pistons away from each other.

12. An apparatus as set forth in claim 11 wherein each of said first and second pistons includes a second axial end surface, said housing including first and second ends for closing opposite ends of said chamber, said second axial end surface of said first piston, said surface means of said housing defining said chamber, and said first end of said housing defining a second fluid pressure chamber, said second axial end surface of said second piston, said surface means of said housing defining said chamber, and said second end of said housing defining a third fluid pressure chamber, said fluid pressure applying means including means for directing fluid pressure to said second and third fluid pressure chambers to move said first and second pistons toward each other.

* * * * *